United States Patent Office 3,180,764
Patented Apr. 27, 1965

3,180,764
PROCESS OF PROTECTING METAL BY THE USE OF A SPRAYABLE COATING
John Timmins, Derby, and Eric Anthony Horbury, Loughborough, Leicester, England, assignors to Rolls-Royce Limited, Derby, England, a British company
No Drawing. Filed July 3, 1961, Ser. No. 121,306
Claims priority, application Great Britain, July 6, 1960, 23,662/60
8 Claims. (Cl. 148—13.1)

This invention relates to the heat treatment of metals. The term "metal" as used herein includes alloys.

This invention provides a process for the heat treatment of metals wherein the metal is coated with one or more layers of a mixture of an organophilic cation-modified clay and an organic solvent and thereafter heated at a temperature of at least 600° C.

The mixture used for the coating may also contain a ceramic frit.

Ceramic frits are well-known in the pottery industry and can be described as glazes which have been partly made and have not been applied to a pot. An example of a suitable glaze frit is the one made by W. Podmore & Sons of Stoke-on-Trent and known as S3 White Opaque Zircon Frit which is in the form of a finely ground powder. Finely powdered glass may also be used as a ceramic frit for the purposes of this invention.

The type of ceramic frit used depends upon the heat treatment temperature and the coefficient of expansion of the frit and metal to be protected, that is, if a heat treatment is above 1000° C. then a frit maturing below this temperature must be used. In order to assist the easy removal of the frit if desired, the expansion of the frit is adjusted by composition so that it is dissimilar to that of the metal, thus causing it to flake off during the cooling down to room temperature after heat treatment. The flaking occurs only after the coating is below its plastic temperature.

A mixture of frits may be used, such as Z3 Lead Sesquisilicate which matures at 640° C. and P.30 Lead Silicate which matures at 850° C.

The P.30, for example, has the following composition in parts by weight:

1 part of lead oxide (PbO)
0.247 part of aluminium oxide ($Al_2O_3$)
1.97 parts of silicon dioxide ($SiO_2$)

It has a coefficient of expansion of $5.6 \times 10^{-6}$ and a softening point of 750° C.

In addition, a binder, e.g., a silicone resin or shellac may be used as a film stiffener. Furthermore, a filler such as china clay, water ground nepheline syenite or quartz, may be used.

Although conventional techniques, such as brushing and dipping may be used for applying the coating, it is preferred to apply the coating in a series of thin layers by spraying the coating on to the metal surface, each spray coating being thoroughly dried in air before application of a further coating.

The term "organophilic cation-modified clay" as used herein means a clay modified by covering the greater part of the surface of the particles of the clay with alkyl or aryl organic radicals coupled to the clay ionically by means of an onium base.

An onium compound has been defined in Hackh's Chemical Dictionary—Second Edition—as "A group of organic compounds of the type RXHy which are isologs of ammonium and contain the element X in its highest positive valency; where X is pentavalent as in ammonium, phosphonium, arsonium and stibonium; where X is tetravalent as in oxonium, sulphonium, selenonium and stannonium compounds and, where X is trivalent, as in iodonium compounds."

They may be considered as addition compounds, this being further described under the heading of oxonium, carbonium, stibonium, -inium -ylium.

The cation-modified clay may be produced for example by converting the organic bases to the salts formed by the addition of an acid such as hydrochloric or acetic acid dissolved in water, and adding the selected onium compound to an aqueous clay dispersion.

The term "clay" as used herein includes montmorillonite, that is, sodium, potassium, lithium and other bentonites, particularly those of the Wyoming and South Dakota (U.S.A.) types, magnesium bentonite sometimes called hectorite and saponite, nentronite and like synthetic base exchange materials.

Details of the preparation of organophilic cation-modified clays are given in British Patents Nos. 664,830 and 782,724 and U.S.A. Patent No. 2,531,444.

Examples of organophilic clays which may be used are dimethyldioctadecyl ammonium montmorillonite, dodecylamine montmorillonite and dimethyldioctadecyl ammonium hectorite. These organophilic clays may be dispersed in one or more liquid organic media. Examples of liquid organic media which may be used are highly polar liquids such as aliphatic alcohols including monohydric alcohols such as methanol, ethanol and propanol; aliphatic esters including ethyl acetate, butyl acetate and amyl acetate; and aliphatic ketones including acetone, methyl ethyl ketone and methyl isobutyl ketone; less polar liquids such as dibutyl phthalate, polyesters, polyamides and alkyd resins; and slightly polar liquids such as aromatic hydrocarbons including benzene, toluene, para and meta xylenes, naphtha, turpentine and dipentene; mineral oils and mineral spirits such as white spirit; and aliphatic hydrocarbons such as hexane and heptane.

The invention is particularly applicable to the treatment of ferrous metals but may also be applied to the treatment of other metals such as titanium and zirconium and alloys containing the same and nickel-based alloys such as the nimonic type of alloys.

The metal surfaces to be treated may be degreased, if necessary, first by paraffin washing if particularly greasy and then by a trichlorethylene vapour degreasing process to remove organic materials and any paint present may be removed by a paint stripper such as methylene chloride. In the case of titanium alloys, if these are of the type which cannot be degreased in trichlorethylene vapour, because of stress corrosion, an alkaline degreaser may be used. Liquid organic media which are particularly useful because of their non-inflammable properties are halogenated aliphatic hydrocarbons such as trichlorethylene and perchlorethylene. Under suitable circumstances it has been found possible to use aqueous emulsions of the organophilic clays.

After the heat treatment any scale present may be removed in the case of stainless steel by spraying with high pressure water followed by immersion in concentrated hydrochloric acid and washing with water.

In the case of titanium and its alloys the scale may be removed by immersion in a bath containing nitric acid (e.g., 20% by volume) and calcium fluoride (e.g., 50 gm./litre) or other insoluble fluoride, which lies quiescent at the bottom of the tank containing the solution. The tank is not agitated and is kept at room temperature. The metal surfaces are immersed in this solution for up to half-an-hour for low temperature heat treatments with longer times for higher temperature heat treatments. The metal substances are then water-washed.

The insoluble fluoride is believed to release fluoride ions which help in etching the scale away but have no deleterious effect on the titanium alloy itself.

In the case of mild steel the scale may be removed by immersion in inhibited concentrated hydrochloric acid followed by washing in water. Alternatively in each case the scale may be removed by abrasive cleaning.

According to one embodiment of the invention a process is provided for the heat treatment of metals to reduce the formation of scale during the heat treatment wherein the metal is coated with one or more layers of a mixture of an organophilic cation-modified clay and an organic solvent and thereafter heated in an atmosphere containing free oxygen at a temperature of at least 600° C.

In this embodiment the mixture used for the coating may also contain a ceramic frit and/or a binder as a film stiffener.

The heat treatment may conveniently be effected at a temperature between 600 and 1200° C. and may for example be applied to stainless steel of the 18% chromium, 8% nickel type, mild steel or titanium or zirconium and their alloys.

The following examples, in which the parts are by weight, except where otherwise stated, illustrate the invention.

Example 1

100 gms. of dimethyldioctadecyl ammonium montmorillonite of the grade sold as Benton 34, the word "Bentone" being a registered trademark, were milled with 5 gms. of an oil-soluble dye, added as a witness of coverage, and 1,000 mls. of toluene in a stainless steel ball mill using stainless steel balls for four hours. This mixture was diluted with 1,000 mls. of toluene and again milled for half-an-hour. The resultant mixture was then diluted with toluene until it was in the proportion of 20 gms. per litre of Bentone 34 in toluene.

A sheet of stainless steel containing 18% of chromium and 8% of nickel was treated as follows:

(1) The sheet being particularly greasy was washed with paraffin and then treated with trichlorethylene vapour to remove any organic materials. Paint was then removed by means of methylene chloride.

(2) As soon as possible after step (1) the surfaces of the sheet were sprayed with one coat of the Bentone 34 in toluene prepared as above. The coating was allowed to dry in air for 10 minutes.

(3) The sheet was inserted into a furnace at 1050° C. for 10 minutes, making sure that there was a free air circulation around the metal surfaces. The sheet was then cooled in air.

(4) The sheet was immersed in concentrated hydrochloric acid at room temperature for 10 minutes.

(5) The sheet was sprayed with high pressure water and dried. The protective coating by preventing oxidation reduced the thickness of the oxide coating normally formed and enabled the coating and any scale formed to be removed in a mild steel type pickle, e.g., concentrated hydrochloric acid.

Example 2

Example 1 was repeated but adding to the Bentone 34 in toluene 6 parts by volume of a 50% weight/weight solution in xylene of a silicone resin (the resin being the material sold by Midland Silicones Limited, of London, as Silicone Resin M.S. 805) per 100 parts by volume of the Bentone 34 in toluene.

Example 3

A sheet of Fortiweld mild steel was treated as follows:
(1) The sheet was degreased by treating with trichlorethylene vapour.
(2) Rust was removed from the sheet by dipping the sheet in a pickle consisting of hydrochloric acid inhibited with Acitrol T2. The Acitrol T2 is supplied by Edgar Vaughan & Co. Ltd., and is used to prevent the hydrochloric acid attacking the mild steel.

(3) The sheet was then swilled in hot water and dried in air.

(4) As soon as possible after step (3) the surfaces of the sheet were sprayed with one coat of the Bentone 34 in toluene prepared as described in Example 2. The coating was allowed to dry in air for 10 minutes.

(5) The sheet was inserted in a furnace at 950° C. for 30 minutes making sure that there was a free air circulation around the metal surfaces. The sheet was then cooled in air.

(6) The sheet was immersed in inhibited concentrated hydrochloric acid at room temperature for 10 minutes.

(7) The sheet was washed with water and dried.

The loss was 0.089 thousandth of an inch per surface whereas in a treatment otherwise identical but not using the Bentone 34 in toluene coating the loss was 2.5 thousandths of an inch per surface.

Example 4

60 gms. of Bentone 34 were milled with 5 gms. of an oil-soluble dye added as a witness of coverage, and 600 mls. of toluene in a stainless steel ball mill for 4 hours. Then 700 gms. of P. 30 lead frit having a coefficient of expansion of $5.6 \times 10^6$ (sold by W. Podmore & Sons Ltd.), 140 gms. of water-ground zircon (sold by W. Podmore & Sons Ltd.) and 600 mls. of toluene were added and the mixture again milled for four hours. To this mixture was then added 1200 mls. of toluene and 120 mls. of a 50% weight/weight solution in xylene of Silicone Resin M.S. 805 and the mixture again milled for half-an-hour.

A sheet of nickel-chromium alloy having a coefficient of expansion of $13.4 \times 10^{-6}$ was treated as follows:

(1) The sheet being particularly greasy was washed with paraffin and then treated with trichloroethylene vapour to remove any organic materials. Paint was then removed by treatment with methylene chloride.

(2) As soon as possible after step (1) the metal surface was sprayed with one coat of the mixture containing Bentone 34 prepared as described above and allowed to dry in air for 10 minutes.

(3) The sheet was inserted into a furnace at 1050° C. for 10 minutes, making sure that there was a free air circulation around the metal surfaces. The sheet was then cooled in air whereby the coating and any scale formed flaked off to leave a clean metal surface.

Example 5

25 gms. of Bentone 34 were milled with 2 gms. of an oil-soluble dye, added as a witness of coverage, and 500 mls. of toluene in a porcelain ball mill using porcelain balls for four hours. Then 400 gms. of water-ground nepheline syenite, 200 gms. of china clay, 80 gms. of water-ground quartz, 200 gms. of S.3 lead frit (coefficient of expansion $5.5 \times 10^{-6}$) all sold by W. Podmore & Sons Ltd. and 500 mls. of toluene were added and the mixture again milled for four hours. To this mixture there was then added 100 mls. of a 50% weight/weight solution in xylene of Silicone Resin M.S. 805 and 200 mls. of toluene and the mixture again milled for half-an-hour.

A sheet of ferritic stainless steel (Firth-Vickers 535) having a coefficient of expansion of $11.0 \times 10^{-6}$ was treated as follows:

(1) The sheet being particularly greasy was washed with paraffin and then treated with trichlorethylene vapour to remove any organic materials. Paint was then removed by means of metylene chloride.

(2) As soon as possible after step (1) the metal surface was sprayed with a first coating of the mixture containing Bentone 34 prepared as described above. The surface was dried in air for 10 minutes and sprayed again, the surface being again allowed to dry in air for 10 minutes.

(3) The sheet was then inserted into a furnace at 650° C. for 1¾ hours, it was then transferred to a furnace at 1170° C. for 1¾ hours followed by an oil quench whereby the coating and any scale formed flaked off to leave a clean metal surface.

The protective coating cut down the normal metal loss when Firth-Vickers 535 steel was heat treated in an air furnace from 11 thousands of an inch per surface to less than ½ thousandth of an inch per surface.

*Example 6*

A sheet of zirconium was treated as follows:

(1) The sheet was treated with the alkaline degreaser sold commercially under the trademark "Othosil." (This is available from Staveley Iron & Chemical Company, of Staveley, Nr. Chesterfield, England.) This was followed by swilling in hot water and allowing to dry.

(2) As soon as possible after step (1) the metal surface was sprayed with a first coating of the mixture containing Bentone 34 prepared as described in Example 4. The surface was then dried in air for 10 minutes and sprayed again, the surface again being allowed to dry in air for 10 minutes. The same steps were repeated to give a third coating.

(3) The sheet was then heat treated at 1200° C. by racking into an air atmosphere furnace, that is, the furnace contained free oxygen, making sure that there was a free circulation around the metal surface. The sheet was then water quenched.

(4) The coating and scale formed was removed by wet blasting with water.

*Example 7*

Example 6 was repeated but using a zirconium alloy (Zircaloy 2) with a coefficient of expansion of $6.0 \times 10^{-6}$. Zircaloy 2 has the approximate composition:

|  | Percent |
|---|---|
| Tin | 1.5 |
| Iron | 0.12 |
| Nickel | 0.05 |
| Chromium | 0.1 | and the remainder zirconium.

The loss was 0.5 thousandth of an inch per surface whereas in a treatment otherwise identical but not using the Bentone in toluene coating the loss was 25 thousandths of an inch per surface.

*Example 8*

Example 4 was repeated but using the alloys known as Nimonic 75 and Nimonic 80 and similar results were obtained.

*Example 9*

100 gms. of Bentone 34 were milled with 5 gms. of an oil-soluble dye, added as a witness of coverage, and 1,000 mls. of toluene in a stainless steel ball mill using stainless steel balls for four hours. This mixture was diluted with 1,000 mls. of toluene and again milled for half-an-hour. The resultant mixture was then diluted with toluene until it was in the proportion of 20 gms. per litre of Bentone 34 in toluene.

A sheet of titanium/copper alloy containing 2% of copper and the balance titanium, except for impurities, the impurities being namely carbon up to 0.1%, hydrogen up to 0.01% and iron up to 0.2%, was treated as follows:

(1) The sheet was degreased using the alkaline degreaser sold commercially under the trademark "Orthosil" (available from Staveley Iron & Chemical Co., of Staveley, Nr. Chesterfield, England), followed by swilling in hot water and allowing the sheet to dry.

(2) As soon as possible after step (1) the surfaces of the sheet were sprayed with one coat of the Bentone 34 in toluene prepared as above. The coating was allowed to dry in air for 10 minutes.

(3) The sheet was inserted into a furnace at 800° C. for 10 minutes, making sure that there was a free air circulation around the metal surfaces. The sheet was then cooled in air.

(4) The scale was removed by immersion in a bath containing nitric acid (20% by volume) and calcium fluoride (50 gms. per litre). The tank was kept at room temperature and not agitated and the metal surfaces were immersed in the solution for half-an-hour.

(5) The metal surfaces were then water washed and air dried. The protective coating reduces metal loss considerably and there is less tendency towards oxygen pick up.

The above examples were repeated but using instead of the Bentone 34, dodecyl montmorillonite (sold under the registered trademark Bentone 18C) and dimethyldioctadecyl ammonium hectoride (sold under the registered trademark Bentone 38) and similar results were obtained.

*Example 10*

100 gms. of dimethyldioctadecyl ammonium hectorite of the grade sold as Bentone 38, were milled with 5 gms. of an oil-soluble dye, added as a witness of coverage, and 1,000 mls. of methylated spirits in a stainless steel ball mill using stainless steel balls for four hours. This mixture was diluted with 1,000 mls. of methylated spirits and again milled for half-an-hour. The resultant mixture was then diluted with methylated spirits until it was in the proportion of 20 gms. per litre Bentone 38 in methylated spirits.

A sheet of nickel-chromium based alloy known as Nimonic 75 was treated as follows:

(1) The sheet being particularly greasy was washed with paraffin and then treated with trichlorethylene vapour to remove any organic materials. Paint was then removed by means of methylene chloride.

(2) As soon as possible after step (1) the surfaces of the sheet were sprayed with one coat of the Bentone 38 in methylated spirits prepared as above. The coating was allowed to dry in air for 10 minutes.

(3) The sheet was inserted into a furnace at 1050° C. for 10 minutes, making sure that there was a free air circulation around the metal surfaces. The sheet was then cooled in air.

(4) The sheet was immersed in a pickle of 200 gms. per litre ferric sulphate and 50 gms. per litre hydrofluoric acid for 30 minutes at a temperature of 60° C.

(5) The sheet was sprayed with high pressure water and dried. The process enables the pickling time to be reduced very considerably (from about 6 hours to 30 minutes), and also reduced metal losses due to oxidation.

What we claim is:

1. A process for the heat treatment of metals in which scale formation during heat treatment is reduced which comprises coating a metal with at least one protective layer of a sprayable coating composition consisting essentially of an organophilic cation-modified clay and an organic solvent, drying the layer of coating composition to deposit on the metal a film of the organophilic cation-modified clay and heating the metal at a temperature of 600° C. to 1200° C. in a non-carburizing atmosphere.

2. A process for the heat treatment of metals to reduce the formation of scale during the heat treatment which comprises coating a metal with at least one protective layer of a sprayable coating composition consisting essentially of an organophilic cation-modified clay and an organic solvent, drying the layer of coating composition to deposit on the metal a film of the organophilic cation-modified clay and heating the metal in a non-carburizing atmosphere containing free oxygen at a temperature of at least 600° C.

3. A process for the heat treatment of metals to reduce the formation of scale during the heat treatment which comprises coating a metal with at least one protective layer of a sprayable coating composition consisting essentially of an organophilic cation-modified clay, a ceramic frit and an organic solvent, drying the layer of coating composition to deposit on the metal a film of the orgonophilic cation-modified clay and heating the metal in a non-carburizing atmosphere containing free oxygen at a temperature of at least 600° C.

4. A process for the heat treatment of metals to reduce the formation of scale during the heat treatment which comprises coating a metal with at least one protective layer of a sprayable coating composition consisting essentially of an organophilic cation-modified clay, a binder and an organic solvent, drying the layer of coating composition to deposit on the metal a film of the organophilic cation-modified clay, heating the metal in a non-carburizing atmosphere containing free oxygen at a temperature of about 1000° C. to 1200° C., cooling the heat treated metal and removing scale.

5. A process for the heat treatment of metals in which scale formation during heat treatment is reduced which comprises coating a metal with at least one protective layer of a sprayable coating composition consisting essentially of dimethyldioctadecyl ammonium montmorillonite and an organic solvent, drying the layer of coating composition to deposit on the metal a film of the said montmorillonite and heating the metal in a non-carburizing atmosphere containing free oxygen at a temperature of at least 600° C.

6. A sprayable coating composition for protecting metals during heat treatment of such metals in a non-carburizing, oxygen-containing atmosphere to a temperature of at least about 600° C., consisting essentially of an organophilic cation-modified clay in an organic solvent in the proportions of about 20 grams of the clay per liter of solvent and a ceramic frit maturing at a temperature below about 1000° C., said coating composition acting to reduce scale formation on said metal during said heat treatment and, when dried, depositing a clay film on said metal.

7. A composition according to claim 6, in which the ceramic frit has a coefficient of expansion differing from that of the metal.

8. A sprayable coating composition according to claim 6, in which are incorporated a binder, a filler and an oil-soluble dye.

References Cited by the Examiner
UNITED STATES PATENTS

| | | | |
|---|---|---|---|
| 2,124,446 | 7/38 | Detwiler | 148—14 |
| 2,531,440 | 11/50 | Jordan | 252—51.5 |
| 2,861,020 | 11/58 | Mills | 148—20.6 |
| 2,898,253 | 8/59 | Schneider et al. | 148—20.6 |
| 3,037,878 | 6/62 | Cowles et al. | 148—13.1 |

DAVID L. RECK, *Primary Examiner.*

RAY K. WINDHAM, *Examiner.*